July 19, 1960
L. WIEDMANN
2,945,573
ELECTROMAGNETIC CLUTCH WITH AUTOMATICALLY ADJUSTABLE AIR GAP
Filed Feb. 11, 1957
2 Sheets-Sheet 1
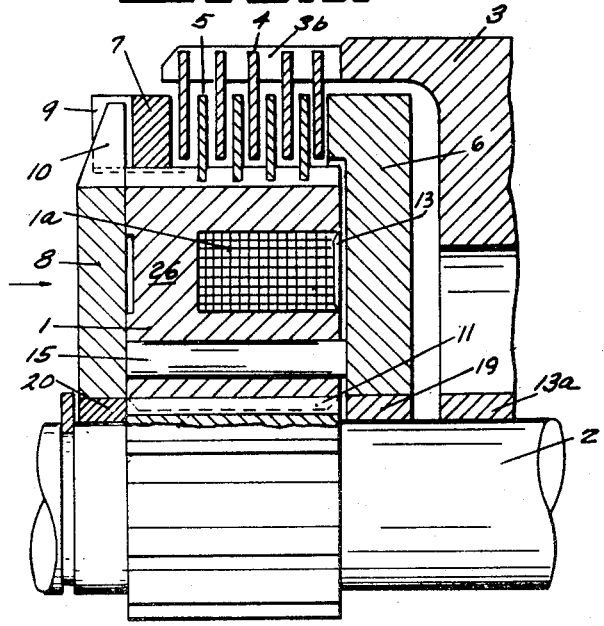
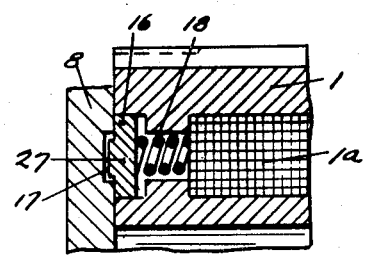
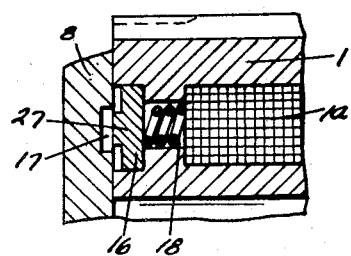
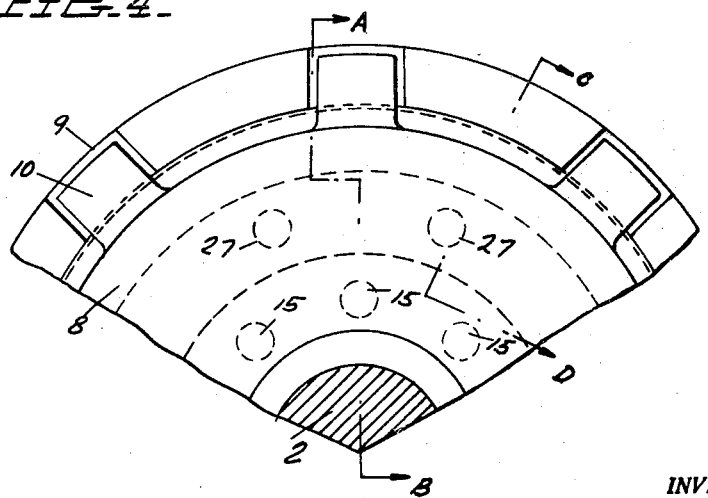
INVENTOR.
LUDWIG WIEDMANN
BY *Ostrolenk Faber,*
*Gerb & Soffen*
ATTORNEYS July 19, 1960  L. WIEDMANN  2,945,573
ELECTROMAGNETIC CLUTCH WITH AUTOMATICALLY
ADJUSTABLE AIR GAP Filed Feb. 11, 1957  2 Sheets-Sheet 2

INVENTOR.
LUDWIG WIEDMANN
BY
ATTORNEYS 2,945,573

ELECTROMAGNETIC CLUTCH WITH AUTOMATICALLY ADJUSTABLE AIR GAP

Ludwig Wiedmann, Friedrichshafen, Germany, assignor to I-T-E Circuit Breaker Company, Philadelphia, Pa., a corporation of Pennsylvania Filed Feb. 11, 1957, Ser. No. 639,423

8 Claims. (Cl. 192—84)

My invention relates to a means for automatically adjusting the air gap of an electromagnetic clutch to thereby compensate for lamination wear.

In the past when the cooperating laminations of a lamination-type clutch wear, the distance between the magnet body and the armature which drives the laminations into engagement with one another is changed to thereby alter the clutch characteristics.

Adjusting means have been provided which are manually operable while the clutch is deenergized. This, however, requires, in some cases, a removal of the clutch from its installation and adjustment thereof by a trial and error process until the correct adjustment is achieved. Furthermore, this adjustment may be required many times during the life of the clutch.

The essence of my invention is to provide means whereby the clutch is automatically adjusted during operation thereof so that the stop position of the lamination is automatically positioned to maintain a predetermined air gap between the energizing magnet body and the armature which drives the laminations into engagement with one another and against the stop member.

Accordingly the primary object of my invention is to provide a novel automatic adjusting means for electromagnetic clutches which automatically controls and maintains the clutch characteristics constant regardless of lamination wear.

Another object of my invention is to provide means for automatically positioning the stop plate against which the armature compacts the laminations in an electromagnetic clutch so that the air gap between the magnet body and the armature is maintained constant.

A still further object of my invention is to provide novel automatic means for measuring the air gap in an electromagnetic clutch and to automatically adjust the lamination stop position to maintain this air gap at a substantially constant value regardless of lamination wear.

These and other objects of the present invention will become apparent when taken in connection with the following description and the drawings in which:

Figure 1 shows a side view of a first embodiment of my invention partially in cross-section.

Figure 2 shows a cross-sectional view of a portion of the clutch of Figure 1 and particularly illustrates the auxiliary locking means for locking the adjusting disc into position during deenergization of the clutch.

Figure 3 is similar to Figure 2 and shows the auxiliary locking means when the clutch is energized.

Figure 4 is a side plan view of the clutch of Figure 1 when seen from the left hand side.

Figure 5:
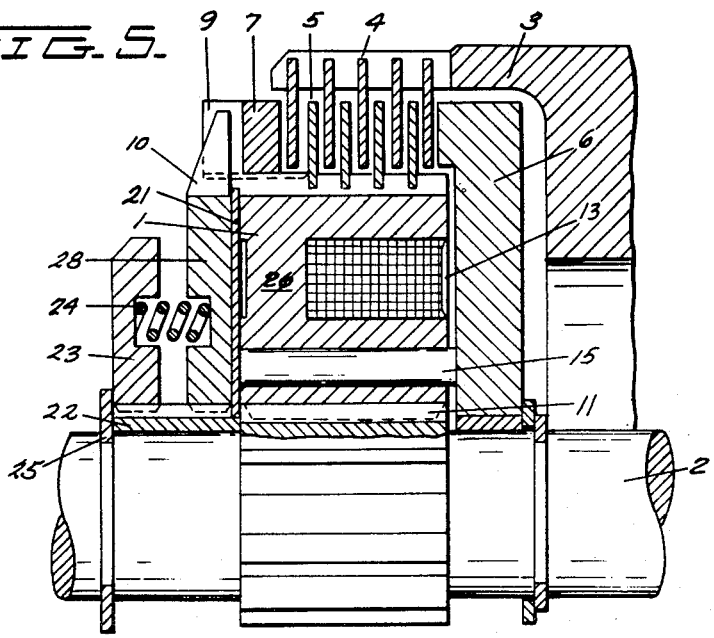
Figure 5 is a side cross-sectional view of a second embodiment of my invention.

Referring first to Figure 1, it is seen that the clutch is comprised of an input shaft 2 having a magnet body 1 keyed thereto by the spline 11 so that the magnet body 1, which contains an energizing coil 1a, is rotatable with shaft 2. The outer periphery of magnet body 1 has inner laminations 5 splined thereto, thereby being rotatable with the drive shaft 2 as well as being axially movable with respect thereto.

An output or driven shaft 3 may then be co-axially positioned with respect to the shaft 2 and is connected thereto by the bushing 3a. The outer portions of the driven member 3 are provided with a key means 3b which contains the outer laminations 4 so that these laminations are rotatable with the driven member 3 but are axially movable with respect thereto.

An armature 6 is rotatably supported with respect to the shaft 2 by means of the bushing 19 and is axially movable with respect to shaft 2, and in a similar manner an adjusting disc 8 is supported from shaft 2 by the bushing 20.

As may be seen in Figures 1 and 4, adjusting disc 8 has protrusions 10 about its outer periphery, these protrusions cooperating with notches 9 in pressure ring 7 which serves as a back stop for laminations 4 and 5, as will be described hereinafter. It is important to note that the pressure ring 7 has internal threads thereon which cooperate with external threads on the periphery of magnet body 1 so that the pressure ring 7 may be threaded to the left or to the right by a clockwise or counterclockwise rotation with respect to magnet body 1.

Pins such as pin 15 having a length which is equal to the width of the magnet body 1 plus the air gap, which is to exist between magnet body 1 and armature 6, are then provided in a plurality of angularly displaced positions about an inner circumference of magnet body 1, as seen in Figure 4.

In operation, energization of coil 1a will cause a magnetic flux to circulate from the magnet body 1, adjusting disc 8, through inner and outer laminations 5 and 4, respectively, through the armature 6 and back to the magnet body. Note that the flux through armature 6 will be substantially greater than the flux through disc 8 since the magnetic path including disc 8 includes the partially short circuiting iron portion 26 to the left of magnet body 1. Therefore, the attracting force on armature 6 is substantially greater than the attracting force on ring 8.

Accordingly the armature 6 will be driven to the left to cause inner and outer laminations 5 and 4 to be compacted against the stop member 7. Furthermore, the adjusting disc 8 will be relatively firmly attracted to the magnet body 1 by this magnet field. Hence, the driving shaft 2 will be rotatably connected to the driven member 3 through the linkage which includes the driving shaft 2, magnet body 1, inner laminations 5, outer laminations 4 and the driven member 3. Hence, the driven member 3 will rotate with the driving member 2 and in a similar manner the adjusting disc 8, which is firmly sealed against the magnet body 1, will rotate with the complete mechanism.

If, however, the laminations wear after an appreciable length of operation, it is seen that the air gap 13 between armature 6 and magnet body 1 which is determined by the thickness of the lamination pack when ring 8 is in a predetermined position, will decrease so as to alter the clutch characteristics. In accordance with my novel invention, however, a decrease in this air gap 13 due to the wearing of laminations will cause the armature 6 to bear against the pins such as pin 15 since pin 15 extends beyond the right hand surface of magnet body 1 by the amount of the desired air gap. Since the attracting force on armature 6 is greater than that on disc 8, the disc 8 will move away from its sealed position with respect to magnet body 1, and will no longer rotate with the magnet body 1. Because of the engagement between protrusions 10 and notches 9 of pressure ring 7, the pressure ring 7 will be threaded to the left or right to thereby alter the stop position of the laminations 4 and 5 and thereby the air gap 13, between armature 6 and magnet body 1. Once the correct air gap (or distance between retainer 7 and armature 6) is achieved, pin 15 no longer bears on disc 8, and the correction is completed.

By way of example, if the magnet body 1 is driven in a counterclockwise direction and the threaded engagement between members 7 and 1 is a right handed thread, and if the laminations wear to cause the air gap 13 to decrease, the disc 8 will be pried away from the magnet body 1 to thereby cause pressure ring 7 to rotate in a clockwise direction to bring the air gap 13 back to its normal predetermined position.

In order to prevent this adjustment of the pressure ring 7 when the clutch is in a deenergized position, it is possible to provide an auxiliary locking means, as seen in Figures 2 and 3, which will lock the angular position of adjusting disc 8 with respect to the magnetic body 1. More specifically, Figure 2 shows the provision of a latching means 16 mounted within the magnet body 1 where the latching means 16 is provided with an extending portion 27 (see Figure 4) which is shaped to cooperate with an aperture 17 in the adjusting disc 8.

In the deenergized condition of the clutch the biasing spring 18 will bias the cooperating latch members 27 and 17 into engagement with one another so that the armature disc 6 cannot be accidentally rotated with respect to the magnet body 1 to thereby alter the air gap adjustment. Member 16, however, is constructed of magnet material so that when the clutch is energized by coil 1a, the magnetic latch member 16 will be magnetically attracted to the position shown in Figure 3 where members 27 and 17 are unlatched and the automatic positioning of adjusting disc 8 and pressure ring 7 may proceed in the manner described hereinabove.

A second embodiment of my novel invention is set forth in Figure 5 wherein like numerals have been assigned to similar components. Figure 5, however, differs from the embodiment of Figure 1 in the use of a non-magnetic adjusting disc 28 which serves the same function as the adjusting disc 8 of Figure 1. In Figure 5, however, a non-magnetic member 21 is placed across the face of magnet body 1 and the adjusting disc 28 is biased into engagement with non-magnetic surface 21 by means of spring biasing member 24 which is backed up by spring bias support member 23.

Spring biasing support member 23 is then keyed to a bushing 22 which is rotatable with respect to drive means 2 and leftward axial motion of bushing 22 is prevented by stop member 25. Clearly the operation of the embodiment of Figure 5 is substantially identical with that of Figure 1, the only exception being that the pins such as pin 15 drives against the force of spring biasing means 24 instead of the magnetic force created by coil 1a in the embodiment of Figure 1.

If desired, a similar type of locking arrangement, as has been set forth above in Figures 2 and 3, could be utilized in the case of Figure 5. It is to be noted that the non-magnetic shield 21 could be eliminated by properly constructing portion 26 of magnet member 1 so that the flux lines may be suitably constrained in this portion and leakage flux would be reduced to a relatively small percentage of the total flux.

Figure 6:
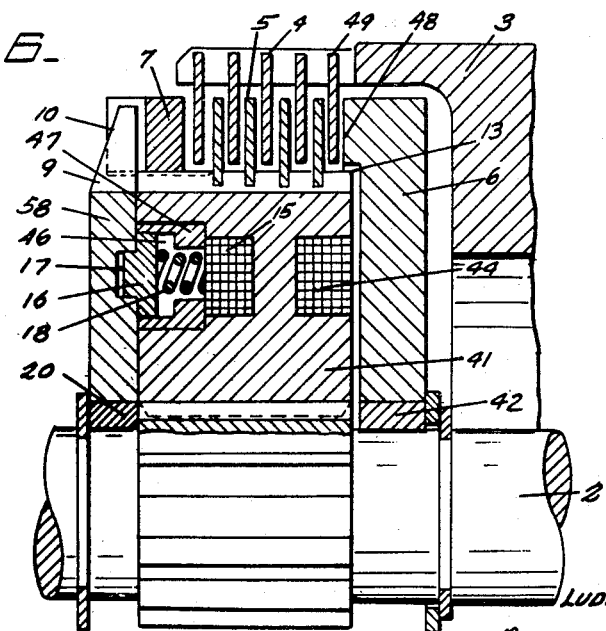
Figure 6 is a third embodiment of my novel invention.

A still further embodiment of my novel invention is set forth in Figure 6 wherein a mechanical measurement of the air gap utilizing a pin member such as pin 15 of Figures 1 and 5 is replaced by an electrical circuit which energizes an auxiliary clutch member when the armature engages the magnet body, thus indicating too small an air gap. More specifically, in Figure 6, adjusting member 58 may be constructed of non-magnetic material and is provided with depressions such as depressions 17 which may receive the latching member 16 which is biased into engagement with depression 17 by the spring biasing means 46.

During the time that the clutch is de-energized, the magnetic latching member 16 serves to lock the retaining ring 7 with respect to the magnetic body. This engagement may be defeated, however, by energization of auxiliary winding 45 which will cause the latching member 16 to be withdrawn from the position shown in Figure 6. The energizing circuit for coil 45 (not shown) may utilize magnet body 41 as a first contact and armature member 6 as a second contact whereby engagement between armature 6 and magnet body 41 closes the circuit to energize coil 45. That is, when the air gap decreases to this minimum value due to wear of laminations 4 and 5, coil 45 will be energized to withdraw latch member 16 and allow the armature disc 58 to thread retaining member 7 to a new position wherein the air gap between the armature and the magnet body achieves a more desirable value.

It is to be noted that the engagement between the driven member 3 and the disc 4 may be insulated as may be the surface 48 of the armature 6 so as to prevent the possibility of a parallel circuit which could energize coil 45. In a similar manner bushings 20 and 42 would be made of non-conductive material so as to prevent a short-circuit between armature 6 and magnet body 41.

It is to be further noted that the magnetic path for coil 45 in energizing the latch member 16 may be of material having a high permeability, higher than the material of magnet body 41 so that the air gap 46 may be closed rapidly responsive to energization of coil 45.

In the foregoing, I have described my invention only in connection with preferred embodiment thereof. Many variations and modifications of the principles of my invention within the scope of the description herein are obivous. Accordingly, I prefer to be bound not by the specific disclosure herein, but only by the appending claims.

I claim:

1. An electromagnetic clutch comprising a driving member and a driven member, a first plurality of laminations connected to said driving member to be rotatable therewith and axially movable thereon, a second plurality of laminations connected to said driven member to be rotatable therewith and axially movable thereon; said laminations of said first and second plurality of laminations being interleaved with respect to one another; a magnet body holding an energizing winding, an armature of magnetic material and a retaining means; said armature and said retaining means being positioned on opposite sides of said first and second plurality of laminations, said magnet body being positioned to create a magnetic flux responsive to energization of said energizing coil to drive said armature towards said retaining means to compact said interleaved laminations between said retaining means and said armature; and adjusting means being operatively connected to said retaining means; said adjusting means including measuring means operatively connected to said armature to measure the position achieved by said armature when said interleaved laminations are compressed; said adjusting means automatically moving said retaining means to maintain a predetermined air gap between said armature and said magnet body when said interleaved laminations wear and cause said air gap to be decreased.

2. A device as set forth in claim 1 wherein said retaining means is threadably engaged by said magnet body; said means for automatically moving said retaining means causing said retaining means to rotate with respect to said magnet body responsive to a change in the air gap between said armature and said body.

3. A device as set forth in claim 2 wherein said retaining means is operatively connected to an adjusting member; said adjusting member being positioned to be biased into engagement with said magnet body; said means for automatically moving said retaining means comprising means for operatively interconnecting said armature and said adjusting member; said interconnecting means being constructed to move said adjusting member away from said magnet body and against the force of said biasing means when the distance between said armature and said air gap differs from a predetermined value to cause relative rotation between said retaining ring and said magnet body until said distance is appropriately adjusted.

4. A device as set forth in claim 3 which further includes auxiliary latch means constructed to latch said retaining ring with respect to said magnet body when said energizing winding is deenergized and to unlatch said retaining means when said energizing winding is energized.

5. A device as set forth in claim 2 wherein said means for automatically moving said retaining means comprises electromagnetic latch means for latching said retaining means to said magnet body; and an auxiliary winding positioned to unlatch said latch means when said auxiliary winding is energized; said auxiliary winding being energized from external circuit means responsive to a predetermined decrease in the air gap between said armature and said magnet body.

6. An electromagnetic clutch comprising a driving member and a driven member, a first plurality of laminations connected to said driving member to be rotatable therewith and axially movable thereon, a second plurality of laminations connected to said driven member to be rotatable therewith and axially movable thereon; said laminations of said first and second plurality of laminations being interleaved with respect to one another; a magnet body holding an energizing winding, an armature of magnetic material and a retaining means; said armature and said retaining means being positioned on opposite sides of said first and second plurality of laminations, said magnet body being positioned to create a magnetic flux responsive to energization of said energizing coil to drive said armature towards said retaining means to compact said interleaved laminations between said retaining means and said armature; said adjusting means being operatively connected to said retaining means; said adjusting means including measuring means operatively connected to said armature to measure the position achieved by said armature when said interleaved laminations are compressed; said adjusting means automatically moving said retaining means to maintain a predetermined air gap between said armature and said magnet body when said interleaved laminations wear and cause said air gap to be decreased; said retaining means is threadably engaged by said magnet body; said means for automatically moving said retaining means causing said retaining means to rotate with respect to said magnet body responsive to a change in the air gap between said armature and said body; and an auxiliary latch means constructed to latch said retaining ring with respect to said magnet body when said energizing winding is de-energized and to unlatch said retaining means when said energizing winding is energized.

7. An electromagnetic clutch comprising a driving member and a driven member, a first plurality of laminations connected to said driving member to be rotatable therewith and axially movable thereon, a second plurality of laminations connected to said driven member to be rotatable therewith and axially movable thereon; said laminations of said first and second plurality of laminations being interleaved with respect to one another; a magnet body holding an energizing winding, an armature of magnetic material and a retaining means; said armature and said retaining means being positioned on opposite sides of said first and second plurality of laminations, said magnet body being positioned to create a magnetic flux responsive to energization of said energizing coil to drive said armature towards said retaining means to compact said interleaved laminations between said retaining means and said armature; said adjusting means being operatively connected to said retaining means; said adjusting means including measuring means operatively connected to said armature to measure the position achieved by said armature when said interleaved laminations are compressed; said adjusting means automatically moving said retaining means to maintain a predetermined air gap between said armature and said magnet body when said interleaved laminations wear and cause said air gap to be decreased; said retaining means is threadably engaged by said magnet body; said means for automatically moving said retaining means causing said retaining means to rotate with respect to said magnet body responsive to a change in the air gap between said armature and said body; said retaining means is operatively connected to an adjusting member of magnetic material; said adjusting member positioned to be sealed to said magnet body when said energizing winding is energized; said means for automatically moving said retaining means comprising means for operatively interconnecting said armature and said adjusting member; said interconnecting means being constructed to move said adjusting member away from said magnet body when the distance between said armature and said air gap differs from a predetermined value to cause relative rotation between said retaining ring and said magnet body until said distance is appropriately adjusted.

8. An electromagnetic clutch comprising a driving member and a driven member, a first plurality of laminations connected to said driving member to be rotatable therewith and axially movable thereon, a second plurality of laminations connected to said driven member to be rotatable therewith and axially movable thereon; said laminations of said first and second plurality of laminations being interleaved with respect to one another; a magnet body holding an energizing winding, an armature of magnetic material and a retaining means; said armature and said retaining means being positioned on opposite sides of said first and second plurality of laminations, said magnet body being positioned to create a magnetic flux responsive to energization of said energizing coil to drive said armature towards said retaining means to compact said interleaved laminations between said retaining means and said armature; said adjusting means being operatively connected to said retaining means; said adjusting means including measuring means operatively connected to said armature to measure the position achieved by said armature when said interleaved laminations are compressed; said adjusting means automatically moving said retaining means to maintain a predetermined air gap between said armature and said magnet body when said interleaved laminations wear and cause said air gap to be decreased; said retaining means is threadably engaged by said magnet body; said means for automatically moving said retaining means causing said retaining means to rotate with respect to said magnet body responsive to a change in the air gap between said armature and said body; said retaining means is operatively connected to an adjusting member of magnetic material; said adjusting member positioned to be sealed to said magnet body when said energizing winding is energized; said means for automatically moving said retaining means comprising means for operatively interconnecting said armature and said adjusting member; said interconnecting means being constructed to move said adjusting means away from said magnet body when the distance between said armature and said air gap differs from a predetermined value to cause relative rotation between said retaining ring and said magnet body until said distance is appropriately adjusted; and an auxiliary latch means constructed to latch said retaining ring with respect to said magnet body when said energizing winding is deenergized and to unlatch said retaining means when said energizing winding is energized.

References Cited in the file of this patent

UNITED STATES PATENTS

| | | |
|---|---|---|
| 762,622 | Eastwood | June 14, 1904 |
| 799,720 | Cutler | Sept. 19, 1905 |
| 1,049,957 | Whitcomb | Jan. 7, 1913 |
| 2,057,876 | Berry | Oct. 20, 1936 |
| 2,692,035 | Rabinow | Oct. 19, 1954 |
| 2,157,709 | Kiessling et al. | May 9, 1939 |
| 2,531,099 | Anderson | Nov. 21, 1950 |